United States Patent
Won et al.

(10) Patent No.: US 9,706,455 B2
(45) Date of Patent: Jul. 11, 2017

(54) METHOD AND APPARATUS FOR ADJUSTING MOBILITY PARAMETER

(71) Applicant: Samsung Electronics Co., Ltd., Suwon-si, Gyeonggi-do (KR)

(72) Inventors: Sung Hwan Won, Suwon-si (KR); Sangbum Kim, Suwon-si (KR); Beomsik Bae, Suwon-si (KR); Hanna Lim, Seoul (KR); Sangsoo Jeong, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/820,146

(22) Filed: Aug. 6, 2015

(65) Prior Publication Data

US 2015/0350975 A1 Dec. 3, 2015

Related U.S. Application Data

(63) Continuation of application No. 13/956,850, filed on Aug. 1, 2013, now Pat. No. 9,131,411.

(30) Foreign Application Priority Data

Aug. 3, 2012 (KR) .................. 10-2012-0085245
Jan. 30, 2013 (KR) .................. 10-2013-0010258

(51) Int. Cl.
*H04W 36/00* (2009.01)
*H04W 76/02* (2009.01)
(Continued)

(52) U.S. Cl.
CPC .... *H04W 36/0083* (2013.01); *H04W 36/0011* (2013.01); *H04W 36/0055* (2013.01);
(Continued)

(58) Field of Classification Search
USPC ................................................. 455/436–448
See application file for complete search history.

(56) References Cited

U.S. PATENT DOCUMENTS 8,417,246 B2* 4/2013 Olofsson ............... H04W 24/08
455/436
2010/0124918 A1 5/2010 Agashe et al.
(Continued)

FOREIGN PATENT DOCUMENTS

EP 2 302 968 A2 3/2011
WO 2010/057125 A1 5/2010
(Continued)

OTHER PUBLICATIONS

Johnson; 32.9 Mobility Robustness Optimisation; Long Term Evolution in Bullets; www.lte-bullets.com; Jul. 6, 2012.

*Primary Examiner* — Joel Ajayi
(74) *Attorney, Agent, or Firm* — Jefferson IP Law, LLP (57) ABSTRACT

A mobility parameter adjustment method and apparatus for use in a wireless communication system is provided. The mobility parameter adjustment method of a base station includes receiving connection failure information from a terminal, and adjusting a mobility adjustment parameter based on the connection failure information. The mobility parameter adjustment method and apparatus of the present disclosure is capable of adjusting mobility parameter efficiently so as to improve the mobility robustness of the wireless communication system and User Equipment (UE).

10 Claims, 9 Drawing Sheets

(51) Int. Cl.
*H04W 36/32* (2009.01)
*H04W 88/08* (2009.01)

(52) U.S. Cl.
CPC ... *H04W 36/0061* (2013.01); *H04W 36/0094* (2013.01); *H04W 36/32* (2013.01); *H04W 76/027* (2013.01); *H04W 76/028* (2013.01); *H04W 88/08* (2013.01)

(56) References Cited

U.S. PATENT DOCUMENTS

| | | |
|---|---|---|
| 2010/0165836 A1 | 7/2010 | Wahlqvist et al. |
| 2010/0173626 A1 | 7/2010 | Catovic et al. |
| 2011/0096671 A1 | 4/2011 | Lindstrom et al. |
| 2011/0105074 A1 | 5/2011 | Wu |
| 2011/0250880 A1 | 10/2011 | Olsson |
| 2012/0069732 A1 | 3/2012 | Xu et al. |
| 2012/0094672 A1* | 4/2012 | Hunukumbure ...... H04W 24/08 455/436 |

FOREIGN PATENT DOCUMENTS

| | | |
|---|---|---|
| WO | 2011/099745 A2 | 8/2011 |
| WO | 2011/127444 A2 | 10/2011 |

* cited by examiner

METHOD AND APPARATUS FOR ADJUSTING MOBILITY PARAMETER

CROSS-REFERENCE TO RELATED APPLICATION(S)

This application is a continuation of U.S. patent application Ser. No. 13/956,850, filed on Aug. 1, 2013 which claimed the benefit under 35 U.S.C. §119(a) of a Korean patent application filed on Aug. 3, 2012 in the Korean Intellectual Property Office and assigned Serial No. 10-2012-0085245, and of a Korean patent application filed on Jan. 30, 2013 in the Korean Intellectual Property Office and assigned Serial No. 10-2013-0010258, the entire disclosure of each of which is hereby incorporated by reference.

TECHNICAL FIELD

The present disclosure relates to a method and apparatus for adjusting a mobility parameter in a wireless communication system.

BACKGROUND

Mobile communication systems have been developed to provide a user the ability to communicate while on the move. With the rapid advance of technologies, mobile communication systems have evolved such that they are now capable of providing a high speed data communication service as well as a voice telephony service.

Figure 1:
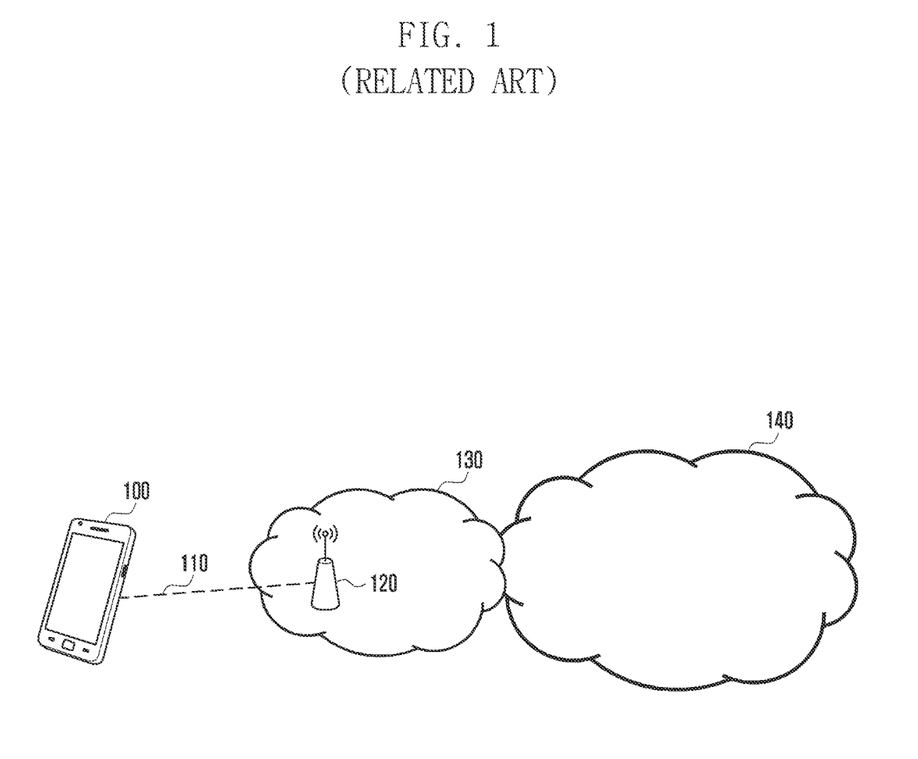
FIG. 1 is a diagram illustrating a wireless communication system according to the related art.

FIG. 1 is a diagram illustrating a wireless communication system according to the related art.

Referring to FIG. 1, the wireless communication system includes a radio access network 130 and a core network 140. The radio access network 130 includes a base station 120. A terminal 100 and the base station 120 are connected through a radio link 110, and other nodes of the wireless communication system are connected through wired links. The base station 120 includes one or more cells, each cell has a certain service coverage area, and the terminal 100 is served within the cell coverage. Here, the cell means the cell of the cellular communication system and although the base station 120 is a device for managing and controlling the cell, the terms "base station" and "cell" are used interchangeably for convenience.

If the terminal 100 moves out of the range of the serving cell or if it is predicted that the terminal 100 will move out of the range of the serving cell, a new cell prepares to serve the terminal 100 to seamlessly provide the terminal with service. This process of changing the serving cell is referred to as handover. The cell serving the terminal 100 before the handover is called the source cell, and the cell to serve the terminal 100 after the handover is called the target cell.

The terminal 100 measures signals from the cells and reports the measurement results to the serving cell. The terminal 100 may measure signals of the serving cell and one or more neighbor cells. The cell receiving the measurement report makes a handover decision based on at least one of the reported measurement information and a previously stored mobility parameter. If the mobility parameter is set to an appropriate value, the handover is triggered at an appropriate time.

Figure 2A:
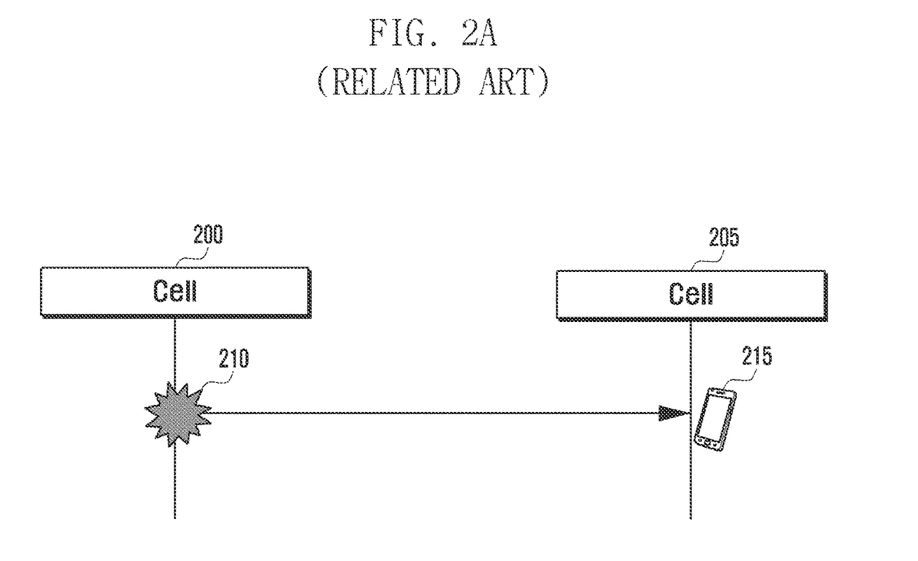
FIG. 2A is a message flow diagram illustrating a situation of Too Late Handover (TLH) according to the related art.
Figure 2B:
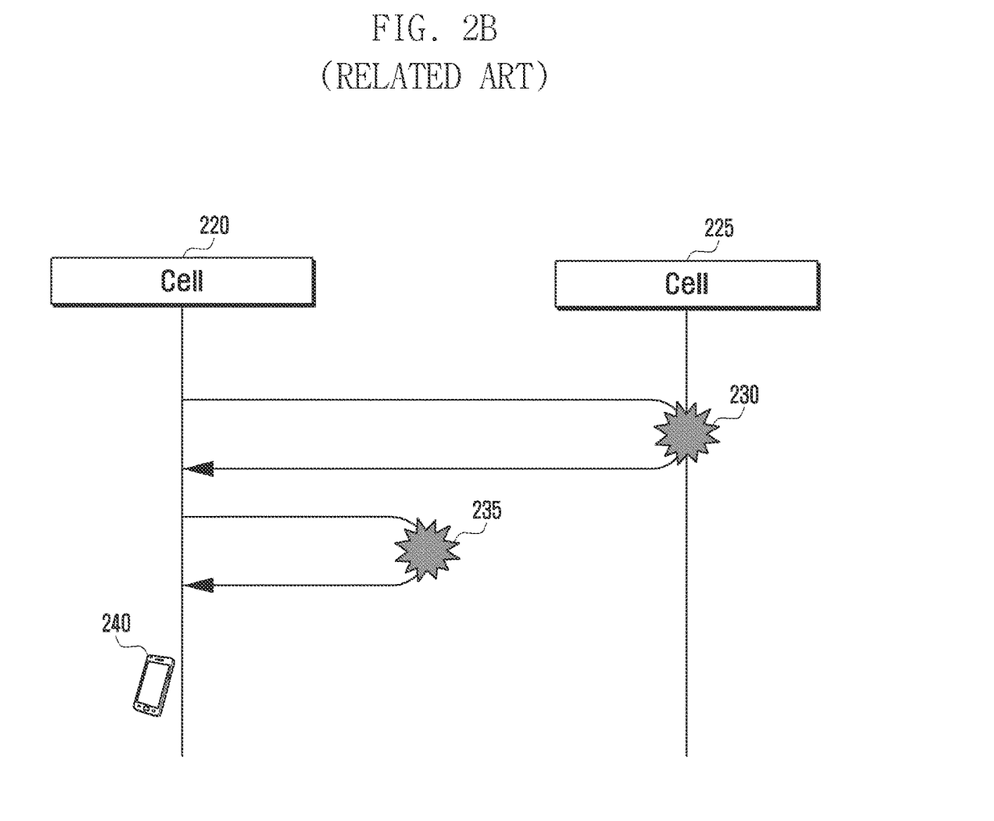
FIG. 2B is a message flow diagram illustrating a situation of Too Early Handover (TEH) according to the related art.
Figure 2C:
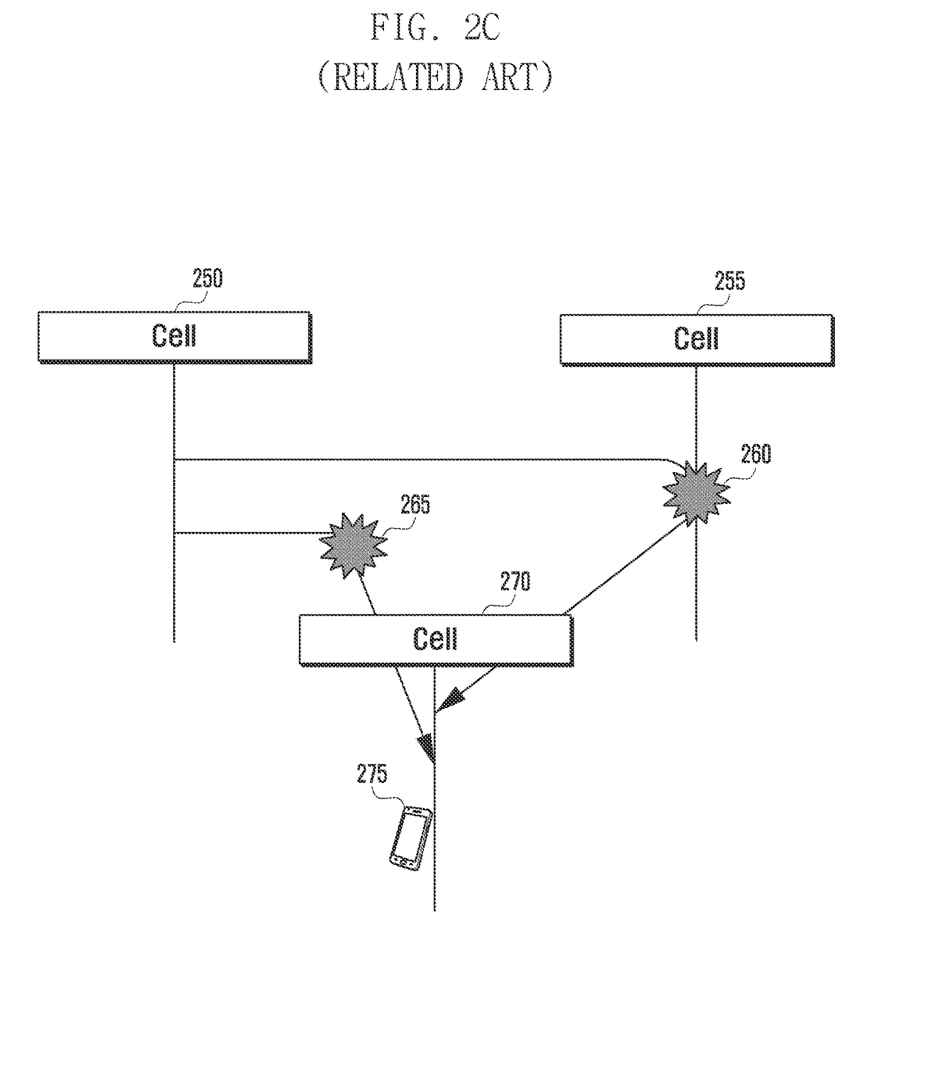
FIG. 2C is a message flow diagram illustrating a situation of Handover to Wrong Cell (HWC) according to the related art.

FIGS. 2A, 2B, and 2C are diagrams illustrating situations of connection failure due to the mobility parameter set inappropriately according to the related art. The connection failure may occur when the handover is not triggered at a supposed time (Radio Link Failure, RLF) or in the middle of the handover process (HandOver Failure, RLF).

FIG. 2A is a message flow diagram illustrating a situation of Too Late Handover (TLH) according to the related art.

In FIG. 2A, the mobility parameter of the cell 200 is configured so as to have a tendency of triggering handover too late. In this case, the cell 200 may continue serving the terminal 215 which is no longer in the service range of the cell 200 so as to cause connection failure as denoted by reference number 210. The terminal 215 may establish a connection to another cell 205 after the connection failure 210. Since the TLH has occurred due to the misconfigured mobility parameter of the cell 200, it is necessary to adjust the mobility parameter of the cell 200. In FIG. 2A, the situation is expressed in such a way that TLH has occurred to the cell 205.

FIG. 2B is a message flow diagram illustrating a situation of Too Early Handover (TEH) according to the related art.

In FIG. 2B, the mobility parameter of the cell 220 is configured so as to have a tendency of triggering handover too early. In this case, the cell 220 may forcibly trigger a handover of the terminal 240 which is still in the service range of the cell 220. This may cause connection failure after successful handover as denoted by reference number 230 or connection failure in the middle of handover process as denoted by reference number 235. The terminal 240 re-establishes a connection with the cell 220 after experiencing one of the connection failures after the successful handover and in the middle of the handover process. Since the TEH has occurred due to the misconfigured mobility parameter of the cell 220, it is necessary to adjust the mobility parameter. In FIG. 2B, the situation is expressed in such a way that TEH has occurred to the cell 225.

FIG. 2C is a message flow diagram illustrating a situation of Handover to Wrong Cell (HWC) according to the related art.

Referring to FIG. 2C, if the mobility parameter of the cell 250 is configured so as to have a tendency of triggering handover to a cell 255 configured with an incorrect mobility parameter, the cell 250 may trigger the handover to the cell 255, which is the wrong cell, rather than the cell 270, whose service coverage area the terminal 275 has actually entered, so as to cause connection failure after successful handover as denoted by reference number 260 or connection failure in the middle of handover process as denoted by reference number 265. The terminal 275 establishes a connection to the cell 270 after experiencing one of the connection failures after successful handover and in the middle of handover process. Since HWC has occurred due to the misconfigured mobility parameter of the cell 250, it is necessary to adjust the mobility parameter. In FIG. 2C, the situation is expressed in such a way that HWC has occurred to the cell 255 or HWC has occurred instead of handover to the cell 270.

It is possible to reduce the frequency of the occurrence of TLH, TEH, and HWC by transmitting, by the cell which has failed the attempted connection, the connection failure information to a new target cell, delivering the connection failure information to the cell whose mobility parameter is necessary to be adjusted, and adjusting the mobility parameter of the corresponding cell. This means the improvement of mobility robustness. Long Term Evolution (LTE) defines a connection failure detection mechanism of the cell of which mobility parameter adjustment is required only when the User Equipment (UE) which has failed connection attempts Radio Resource Control (RRC) re-establishment to a new cell.

However, the current handover mechanism has drawbacks in that 1) the connection failure information stored in the UE may be transmitted, with partial omission, to the cell requiring mobility parameter adjustment, 2) the terminal cannot detect any connection failure without attempt of RRC re-establishment, and 3) a method of adjusting the mobility parameter after detecting the connection failure is not specified. Therefore, there is a need for an apparatus and a method capable of improving the mobility robustness to overcome the above problem.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly an aspect of the present disclosure is to provide a method and apparatus for adjusting a mobility parameter efficiently.

In accordance with an aspect of the present disclosure, a mobility parameter adjustment method of a base station is provided. The method includes receiving connection failure information from a terminal, and adjusting a mobility adjustment parameter based on the connection failure information.

In accordance with another aspect of the present disclosure, a base station for adjusting a mobility parameter is provided. The base station includes a communication unit configured to receive connection failure information from a terminal, and a control unit configured to adjust the mobility parameter based on the connection failure information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the description is directed to a Long Term Evolution (LTE) radio access network and core network and Evolved Packet Core (EPC) specified in the $3^{rd}$ Generation Partnership Project (3GPP), it will be understood by those skilled in the art that the present disclosure can be applied to other communication systems having a similar technical background and channel format, with a slight modification, without departing from the spirit and scope of the present disclosure.

Figure 3:
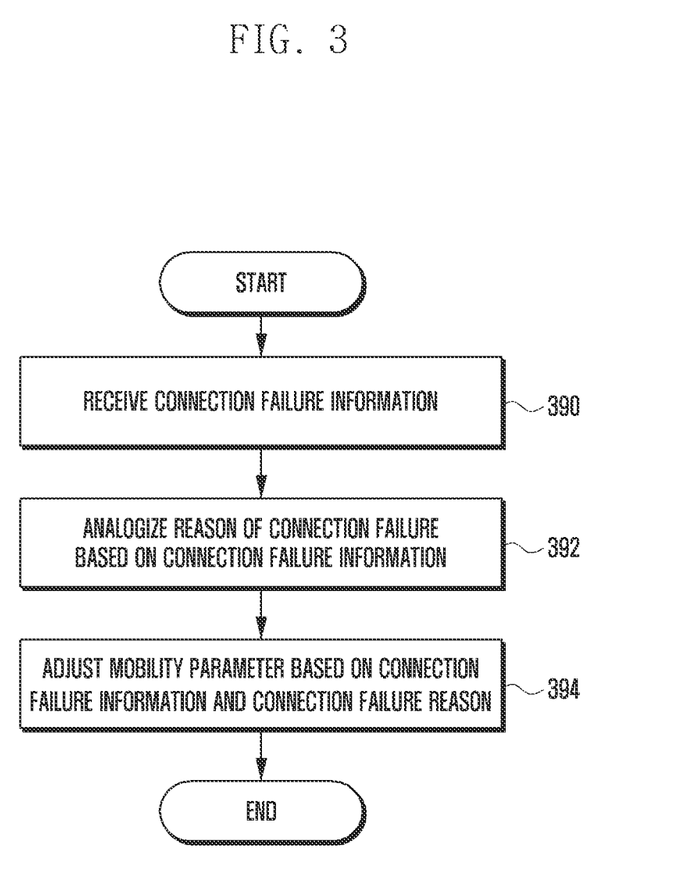
FIG. 3 is a flowchart illustrating a mobility parameter adjustment method of an evolved Node B (eNB) according to an embodiment of the present disclosure.

FIG. 3 is a flowchart illustrating a mobility parameter adjustment method of an evolved Node B (eNB) according to an embodiment of the present disclosure.

Referring to FIG. 3, the eNB receives connection failure information at operation 390. A method of receiving connection failure information is described with reference to FIG. 4.

Figure 4:
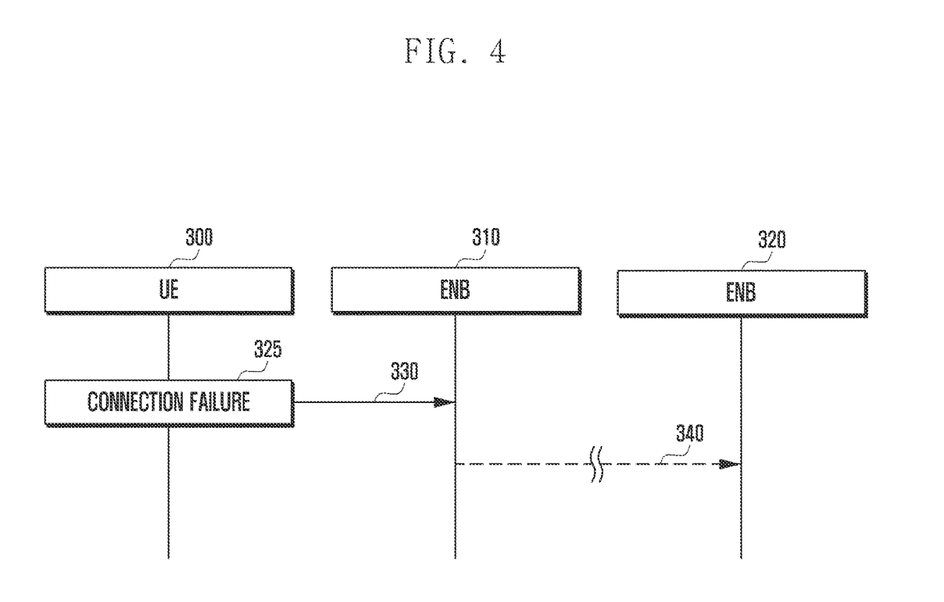
FIG. 4 is a signal flow diagram illustrating signal flows for connection failure information transmission in a mobility parameter adjustment method according to an embodiment of the present disclosure.

FIG. 4 is a signal flow diagram illustrating signal flows for connection failure information transmission in a mobility parameter adjustment method according to an embodiment of the present disclosure.

According to an embodiment of the present disclosure, the terminal 300 may undergo connection failure and transmit the connection failure information. The eNBs 310 and 320 may exchange the connection failure information through an inter-eNB interface. According to an embodiment of the present disclosure, the connection failure information may be transmitted to the cell of which mobility parameter is required.

Referring to FIG. 4, the UE 300 undergoes connection failure at operation 325. The terminal 300 which has experienced the connection failure sends a message including the connection failure information to a new eNB 310 at operation 330. This message may be any of RRCConnectionReestablishmentComplete message, RRCConnectionReestablishmentRequest message, and UEInformationResponse message. The connection failure information may include the information collected from at least one of the cell serving the terminal before the occurrence of the connection failure and the neighbor cells. The information collected from at least one cell may include the barring or non-barring state per cell, minimum required RX level from the cell, minimum required quality level from the cell, maximum Transmission (Tx) power level, and the like.

If the eNB 310 to which the UE 300 has established a connection after connection failure is not the base station managing the cell for which mobility parameter adjustment is required, the UE 300 which has received the connection failure information from the UE 300 sends the eNB 320 managing the cell for which mobility parameter adjustment is required a message including the connection failure information in operation 340. This message is delivered from the eNB 310 to the eNB 320 directly or relayed by another eNB. The message may be one of HANDOVER REPORT message and RLF INDICATION message. The connection failure information may include at least one of the information collected by the terminal and RLF report.

If the connection failure information is received from the UE 300, the eNB 310 determines whether the eNB to which the corresponding information is addressed or of which mobility parameter is required to be adjusted according to the connection failure information is the eNB 310 itself. If it is determined that the eNB of which the mobility parameter is required to be adjusted is the eNB 310 itself, the eNB 310 adjusts its mobility parameter based on the connection failure information. If it is determined that the eNB of which the mobility parameter is required to be adjusted is not the eNB 310 itself, the eNB 310 transmits the connection failure information to the eNB whose mobility parameter is required to be adjusted.

Returning to FIG. 3, if the connection failure information is received, the eNB determines the reason for the connection failure based on the connection failure information at operation 392. A mode of operation 392 is described with reference to FIG. 5.

Figure 5:
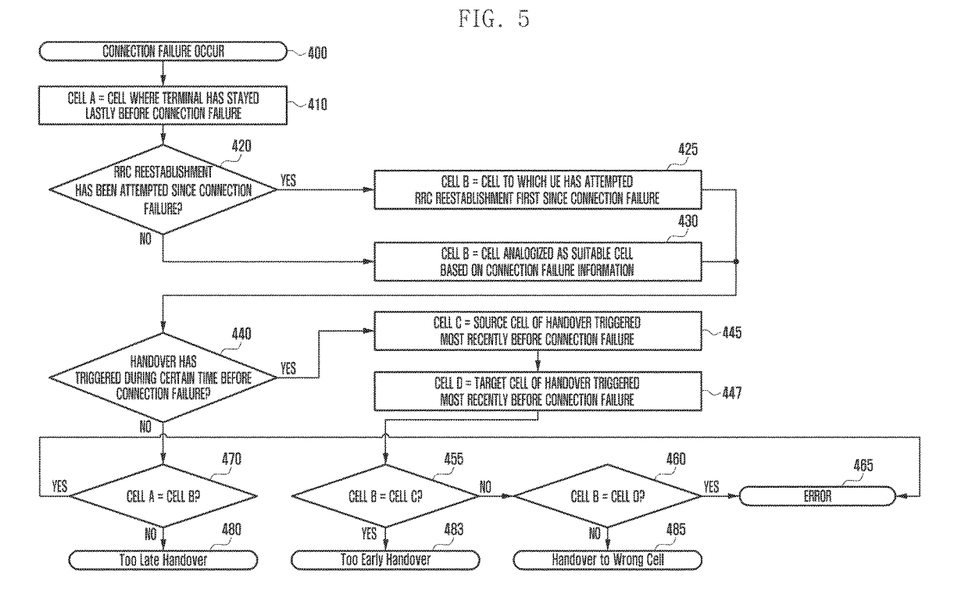
FIG. 5 is a flowchart illustrating a connection failure detection procedure of a mobility parameter adjustment method according to a second embodiment of the present disclosure.

FIG. 5 is a flowchart illustrating a connection failure detection procedure of a mobility parameter adjustment method according to a second embodiment of the present disclosure.

According to the second embodiment, the radio access network may detect the connection failure regardless of RRC reestablishment. Using this feature, a method for detecting the connection failure regardless of RRC reestablishment is disclosed. The eNB of the radio access network according to the second embodiment may use the connection failure information received from at least one of the terminal or another eNB according to the first embodiment to detect the connection failure.

Referring to FIG. 5, when connection failure occurs, it is possible to detect one of TLH 480, TEH 483, and HWC 485.

In FIG. 5, connection failure occurs at operation 400. The cell A is configured as the cell in which the UE has most recently stayed before the connection failure at operation 410.

The eNB determines whether the RRC reestablishment has been attempted for the duration until the UE connects to the eNB normally since the connection failure at operation 420. If the RRC reestablishment has been attempted for the duration, the procedure goes to operation 425 and, otherwise, to operation 430. If the RRC reestablishment has been attempted for the corresponding duration, the cell B is configured as the cell to which the UE has attempted the RRC reestablishment first since the connection failure at operation 425. If the RRC reestablishment has not been attempted for the corresponding duration, the cell B is configured as the best cell analogized from the connection failure information, i.e. best cell that might serve the UE most appropriately at the time of connection failure, at operation 430.

The eNB determines whether any handover of the corresponding UE has been triggered for a certain duration before the occurrence of the connection failure at operation 440. If no handover of the corresponding UE has been triggered for the certain duration before the occurrence of the connection failure, the procedure goes to operation 470. If any handover of the corresponding UE has been triggered for a predetermined duration before the occurrence of the connection failure, the procedure goes to operation 445.

The eNB determines whether the cell A is identical with the cell B at operation 470. If the cell A is identical with the cell B, this means an error has occurred at operation 465. In this case, the eNB may perform an appropriate error handling process or ends the procedure without extra handling. If the cell A is not identical with the cell B, the cell determines the situation as Too Late Handover (TLH) at operation 480. At this time, it may be determined that the handover from cell A to cell B has occurred too late. Accordingly, there is a need of adjusting the mobility parameter such that the handover from the cell A to the cell B occurs at an earlier time.

In some embodiments, the operation of determining whether the two cells match may be the operation of determining whether the identifiers of the two cells match each other. According to another embodiment of the present disclosure, the operation of determining whether the two cells match each other may be the operation of determining whether the Radio Access Technology (RAT) of one cell is identical with the RAT of another cell.

According to a modified embodiment, if the handover of the UE is not triggered in a certain time since the connection failure, this situation may be regarded as TLH without determination of whether the cells A and B match. Although it is not a precise method and thus may misjudge the connection failure reason as TLH, this method is advantageous in processing simplicity.

In summary, if any connection failure has occurred, if RRC reestablishment has been attempted, if no handover has been triggered in a certain time (certain time duration) before the connection failure, and if the cell (cell A) in which the terminal most recently received service before the connection failure differs from the cell (cell B) to which the terminal has attempted RRC reestablishment first, it is determined that the reason of connection failure is TLH.

If any connection failure has occurred, if no RRC reestablishment has been attempted before the UE connects to the eNB normally since the connection failure, if no handover has been triggered in a predetermined duration before the connection failure, if the cell (cell A) in which the UE most recently received service before the connection failure and the cell (cell B) which is analogized, based on the connection failure information, as the best cell at the time when the connection failure has occurred differ from each other, it is determined that TLH is the reason of handover failure.

In the case that the handover has been triggered in a certain time before the connection failure at operation 440, the cell C is configured as the source cell of the handover triggered most recently before the connection failure at operation 445. Likewise, the cell D is configured as the target cell of the handover triggered most recently at operation 447. The eNB determines whether the cells B and C are identical with each other at operation 455. If the cells B and C are identical with each other, the eNB assumes that the reason of the connection failure is TEH at operation 483. At this time, it is determined that the handover from the cell C to the cell D has occurred too early. Accordingly, it is necessary to adjust the handover from the cell C to the cell D to occur at a time later.

Operation 483 can be summarized as follows: if connection failure has occurred, if the UE has attempted RRC reestablishment until the UE connects to the eNB since the connection failure, if no handover has been triggered in a certain time before the occurrence of the connection failure, if the cell (cell B) to which the RRC reestablishment has been attempted is identical with the source cell (cell C) of the handover which has been triggered lastly before the occurrence of the connection failure, it is determined that the reason of the connection failure is TEH.

Also, if connection failure has occurred, if no RRC reestablishment has been attempted until the UE connects to the eNB normally since the connection failure, if no handover has occurred in a certain duration before the connection failure, if the cell (cell B) which is analogized as the best cell for serving the UE at the time when the connection failure has occurred is identical with the source cell (cell C) of the handover triggered lastly before the connection failure, the eNB determines that the reason of the connection failure is TEH at operation 483.

If it is determined that the cells B and C are not identical with each other at operation 455, the eNB determines whether the cells B and D are identical with each other at operation 460. If the cells B and D are not identical with each other, it may be analogized that the reason of the connection failure is HWC at operation 485. At this time, it is determined that the handover has been performed to the cell D wrongly in the situation that the handover should have been performed from the cell C to cell B. Accordingly, it is necessary to adjust the mobility parameter such that the handover from the cell C to the cell B occurs at a time later or earlier. The two kinds of adjustments may be performed simultaneously.

That is, if the connection failure has occurred, if the RRC reestablishment has been attempted until the UE has connected to the eNB normally since the connection failure, if handover has been triggered in a certain duration before the occurrence of the connection failure, and if the cell (cell B) attempted RRC reestablishment first since the connection failure differs from the source cell (cell C) of the handover triggered lastly before the occurrence of the connection failure and the target cell (cell D), the eNB determines that the reason of the connection failure is HWC at operation 485.

Also, if connection failure has occurred, if no RRC reestablishment has been attempted until the UE has connected to the eNB normally since the connection failure, if a handover has been triggered in a certain time duration before the connection failure, and if the cell (cell B) analogized as the best cell for serving the UE at the time of the connection failure based on the connection failure information differs from the source cell (cell C) of the handover triggered lastly before the connection failure and the target cell (cell D), the eNB determines that the reason of the connection failure is HWC at operation 485.

If it is determined that the cells B and D are identical with each other at operation 460, this is judged as an erroneous situation at operation 465 and thus the eNB performs an error handling process or ends the procedure without taking any action.

In the above described connection failure detection methods, the cell analogized as the best cell for serving the UE at the time of the connection failure based on the connection failure information at operation 430 may be one of the cells from which the measurement information contained in the RLF report have been collected. The eNB analogizes the cell based on at least one Evolved universal terrestrial radio access network Cell Global Identifier (ECGI) including a Public Land Mobile Network (PLMN) identifier, a Closed Subscriber Group (CSG) identifier, Reference Signal Received Power (RSRP), Reference Signal Received Quality (RSRQ), a barring policy, a minimum required RX level, a minimum required quality level, and a maximum TX power level, of the cell from which the measurement information is collected. The analogized cell (cell B at operation 430) may be one of the best-measured cell before the connection failure, a suitable cell likely to be selected in applying the cell selection rule, and the cell having established an RRC connection first since the connection failure.

Returning to FIG. 3, the eNB adjusts the mobility parameter according to at least one of the connection failure information and analogized connection failure reason at operation 394.

The eNB managing the cell requiring mobility parameter adjustment adjusts the mobility parameter. The eNB may use at least one of the connection failure information received from at least one of the UE and other eNBs and the connection failure reason analogized through the procedure of FIG. 5 for adjustment of the mobility parameter. The eNB is capable of adjusting the mobility parameter appropriately based on the collected information.

Assuming that the mobility parameter of the cell before mobility parameter adjustment is $\overline{P}_{old}$ and the adjusted mobility parameter is $\overline{P}_{new}$, $\overline{P}_{old}$ and $\overline{P}_{new}$ can be considered as vectors in the same dimension (in case of 1 dimension, scalar). According to a third embodiment, $\overline{P}_{new}$ can be acquired using Equation (1):

$$\overline{P}_{new} = \overline{P}_{old} + \overline{H} \tag{1}$$

In Equation (1), $\overline{H}$ denotes a function, codomain elements of $\overline{H}$ are vectors or scalars having the same dimension, and the element of the domain of $\overline{H}$ may have a form of one of a set and a vector. The elements of the domain may include at least one of $\overline{P}_{old}$ and entire (partial) information collected by the eNB managing the cell requiring mobility parameter adjustment. The information collected by the eNB may include at least one of connection failure information received from at least one of the terminal and other eNBs through the procedure of FIG. 4 and the connection failure reason acquired through the procedure of FIG. 5.

Although $\overline{P}_{new}$ is acquired by adding $\overline{H}$ to $\overline{P}_{old}$ in the above described method, it is obvious to those in the art that the $\overline{P}_{new}$ can be acquired through another method by modifying $\overline{H}$ appropriately in the above described method.

$\overline{H}$ can be configured to satisfy at least one of the following conditions.

i. If it is determined, based on the collected information, that TLH has occurred to a specific cell frequently, $\overline{P}_{new}$ is adjusted to trigger the handover to the specific cell earlier as compared to $\overline{P}_{old}$.
ii. If it is determined, based on the collected information, that TEH has occurred to a specific cell frequently, $\overline{P}_{new}$ is adjusted to trigger the handover to the specific cell later as compared to $\overline{P}_{old}$.
iii. If it is determined, based on the collected information, that HWC has occurred to a specific cell frequently, $\overline{P}_{new}$ is adjusted to trigger the handover to the specific cell later as compared to $\overline{P}_{old}$.
iv. If it is determined that HWC has occurred frequently instead of handover to a specific cell, $\overline{P}_{new}$ is adjusted to trigger the handover to the specific cell earlier as compared to $\overline{P}_{old}$
v. The magnitude of an element of $\overline{H}$ is determined based on at least one of $\overline{P}_{old}$ and measurement information included in the connection failure information.
vi. If it is determined, based on the collected information, that TLH has occurred to a specific cell frequently, $\overline{P}_{new}$ is adjusted to trigger the handover to the specific cell earlier as compared to $\overline{P}_{old}$.
vii. if it is determined, based on the collected information, that TEH has occurred to a specific cell frequently, $\overline{P}_{new}$ is adjusted to trigger the handover to the specific cell later as compared to $\overline{P}_{old}$.

In the above method, the criteria for judging frequent occurrence of TLH, TEH, or HWC and adjustment of the mobility parameter to trigger the handover earlier or later can be configured per eNB.

Figure 6:
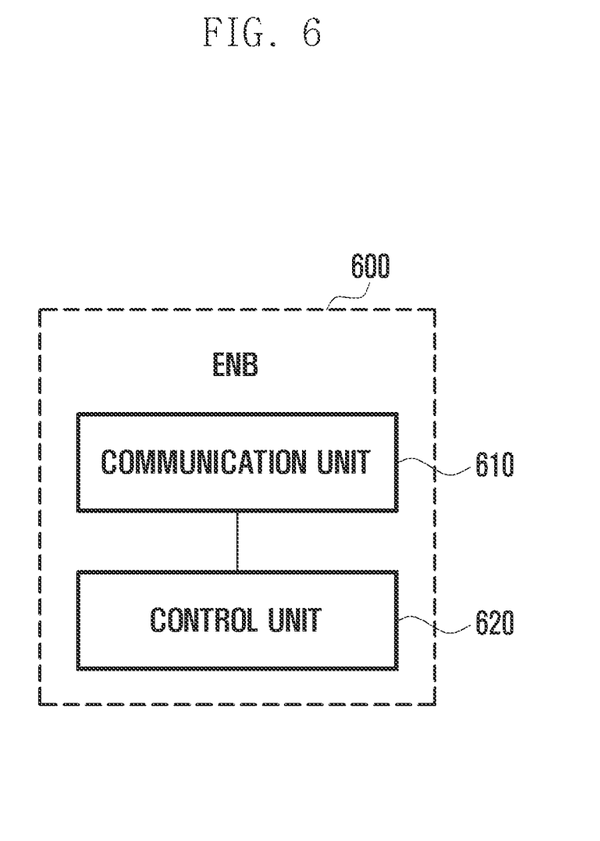
FIG. 6 is a block diagram illustrating a configuration of an eNB according to an embodiment of the present disclosure.

FIG. 6 is a block diagram illustrating a configuration of an eNB according to an embodiment of the present disclosure.

As shown in FIG. 6, the eNB 600 includes a communication unit 610 and a control unit 620. The communication unit 610 is responsible for communication of the terminal 600 with network entities. The control unit 620 controls overall operations of the eNB. The eNB 600 may include further components in addition to the communication unit 610 and the control unit 620. However, illustrations of the components that are not related to the present disclosure are not depicted in the drawing.

In an embodiment of the present disclosure, the communication unit 610 sends the connection failure information received from the UE to the control unit 620 or another eNB. The communication unit 610 is also capable of transmitting handover command and other control messages to the UE under the control of the control unit 620.

According to an embodiment of the present disclosure, the control unit 620 is capable of analogizing the connection failure region from the connection failure information transmitted by the UE. The control unit 620 is also capable of adjusting a mobility parameter according to the analogized connection failure reason and/or connection failure information. The method for adjusting the mobility parameter has been described with reference to operation 394 of FIG. 3. The control unit 620 makes a handover decision based on the adjusted mobility parameter and controls the communication unit 610 to transmit a handover command.

Figure 7:
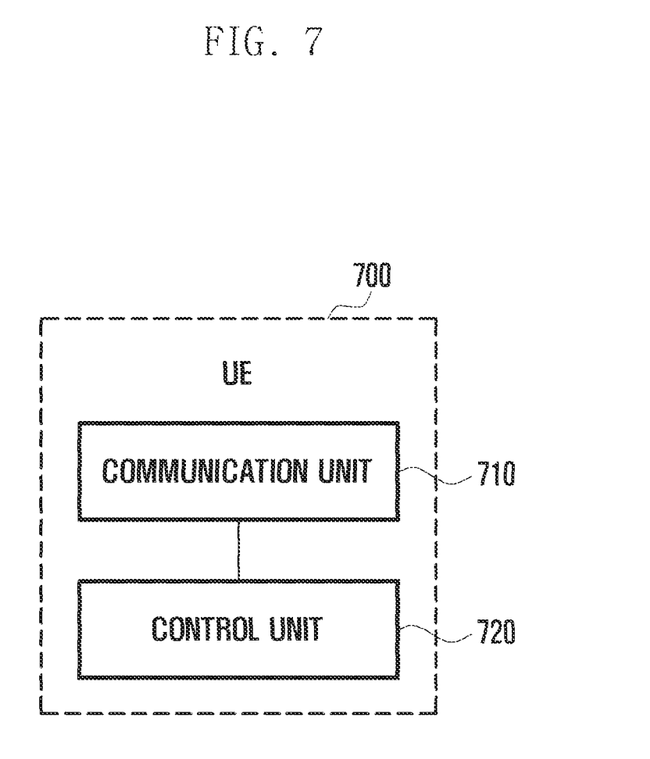
FIG. 7 is a block diagram illustrating a configuration of a User Equipment (UE) according to an embodiment of the present disclosure.

FIG. 7 is a block diagram illustrating a configuration of a UE according to an embodiment of the present disclosure.

As shown in FIG. 7, the terminal 700 includes a communication unit 710 and a control unit 720. The communication unit 710 is responsible for communication of the terminal 700 with a base station and other network entities. The control unit 720 controls overall operations of the terminal 700. The terminal 700 may further include other components in addition to the communication unit 710 and the control unit 720. However, illustrations of the components that are not related to the present disclosure are not depicted in the drawing.

The communication unit 710 may receive a handover command from the eNB. The control unit 710 is capable of controlling the communication unit 720 to perform handover according to the handover command. When connection failure occurs, the control unit 720 generates connection failure information and controls the communication unit 710 to transmit the connection failure information to the eNB connected afterward.

As described above, a mobility parameter adjustment method and apparatus of the present disclosure is capable of adjusting a mobility parameter efficiently so as to improve the mobility robustness of the wireless communication system and UE.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to embodiments of the disclosure, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a first base station, the method comprising:
   receiving a first message including a radio link failure (RLF) report from a second base station which received the RLF report from a terminal, wherein the RLF report is generated from the terminal;
   identifying a reason for an RLF of the terminal based on the RLF report; and
   transmitting, when the reason for the RLF is too early handover, a second message including the RLF report which is generated from the terminal and included in the first message based on the identification to the second base station,
   wherein the RLF report in the second message includes at least one identity of a public land mobile network (PLMN).

2. The method of claim 1, wherein the first message includes an RLF INDICATION message.

3. The method of claim 1, wherein the second message includes a HANDOVER REPORT message.

4. The method of claim 1, wherein the second message is transmitted to a network node of which a mobility parameter is required to be adjusted based on the identification.

5. The method of claim 1, wherein the RLF report is used to identify a cell for serving the terminal at the time of the RLF.

6. A first base station comprising:
   a communication unit configured to transmit and receive a signal; and
   a control unit configured to:
      receive a first message including a radio link failure (RLF) report from a second base station which received the RLF report from a terminal, wherein the RLF report is generated from the terminal,
      identify a reason for an RLF of the terminal based on the RLF report, and
      transmit, when the reason for the RLF is too early handover, a second message including the RLF report which is generated from the terminal and included in the first message based on the identification,
   wherein the RLF report in the second message includes at least one identity of a public land mobile network (PLMN).

7. The first base station of claim 6, wherein the first message includes an RLF INDICATION message.

8. The first base station of claim 6, wherein the second message includes a HANDOVER REPORT message.

9. The first base station of claim 6, wherein the second messaged is transmitted to a network node of which a mobility parameter is required to be adjusted based on the identification.

10. The first base station of claim 6, wherein the RLF report is used to identify a cell for serving the terminal at the time of the RLF.

* * * * *